United States Patent Office 3,551,467
Patented Dec. 29, 1970

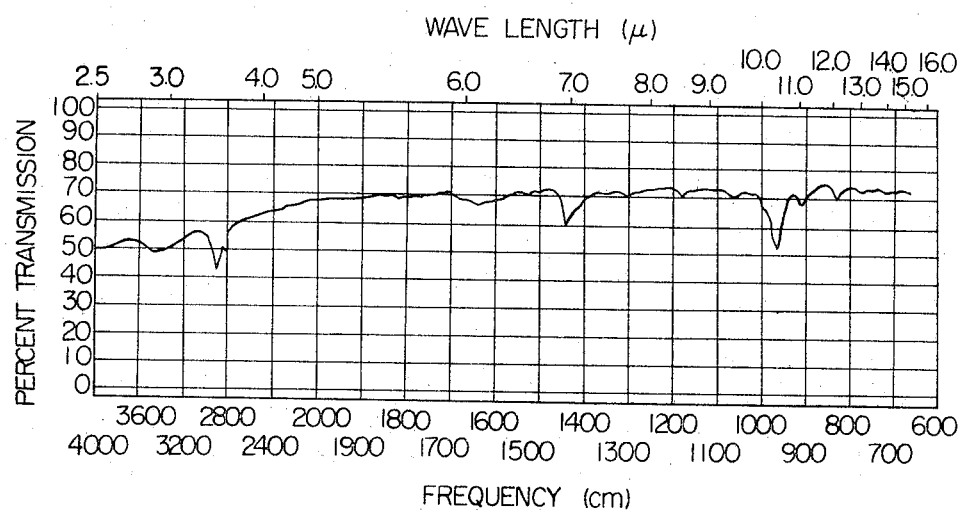

3,551,467
PROCESS FOR PREPARING DIOLEFIN NICKEL HALIDE COMPLEXES
Takaaki Arakawa and Kenji Saeki, Iwakuni-shi, Japan, assignors to Mitsui Petrochemical Industries, Ltd., Tokyo, Japan, a corporation of Japan
Filed May 27, 1968, Ser. No. 732,126
Claims priority, application Japan, May 31, 1967, 42/34,198
Int. Cl. C07c 3/10; C07f 15/04
U.S. Cl. 260—439    11 Claims

ABSTRACT OF THE DISCLOSURE

A process for preparing diolefin nickel halide complexes which can be utilized for providing a catalyst system for an oligomerization of olefins, and is characterized in that a system obtained by reducing a nickel salt (inorganic or organic salts of nickel, inclusive of nickel chelate compounds) with an organoaluminum compound in the presence of a conjugated diolefin is reacted with a compound of the following formula

wherein Z is a halogen, $R_1$, $R_2$ and $R_3$ are each a member, which may be the same or different, selected from the group consisting of halogens, alkyl and aryl, exclusive than $R_1$, $R_2$ and $R_3$ are aryl at the same time.

---

This invention relates to a process for preparing diolefin nickel halide complexes which can be utilized for providing a catalyst system for an oligomerization of olefins. More particularly, the invention relates to a process for preparing diolefin nickel halide compelexes which is characterized in that a system obtained by reducing a nickel salt (inorganic or organic salts of nickel, inclusive of nickel chelate compounds) with an organoaluminum compound in the presence of a conjugated diolefin is reacted with a compound of the following formula

wherein Z is a halogen, $R_1$, $R_2$ and $R_3$ are each a member, which may be the same or different, selected from the group consisting of halogens, alkyl and aryl, exclusive that $R_1$, $R_2$ and $R_3$ are aryl at the same time.

The diolefin nickel halide complexes obtained by the process of the present invention can be utilized favorably as a constituent component of a catalyst for the oligomerization of olefins by combining with 0.5–30 mols, preferably 1–10 mols, per mol of said complex, of at least one aluminum halide such as, for example, aluminum trichloride, aluminum tribromide, or organoaluminum halides such as diethylaluminum chloride and ethylaluminum dichloride, and further optionally with not more than 10 mols per mol of said complex of an organic compound of a metal of the Group V–A of the periodic table selected from the group consisting of phosphorus, arsenic, antimony and bismuth, such as, for example, triethyl phosphine, triisopropyl phosphine, tri-n-butyl phosphine, tricyclohexyl phosphine, triphenyl phosphine, triphenyl phosphite, tricresyl phosphite, tri-o-diphenyl phosphite, diphenylphenoxy phosphine, diphenyl-p-cresyl posphine, triphenyl arsine, triphenyl stibine and triphenyl bismuth.

This catalyst demonstrates improved properties when utilized for the preparation of olefin low polymers such as, for example, butene, hexene and methyl pentene from ethylene or, for example, hexene, methyl pentene and dimethyl butene from propylene. That is to say, the aforesaid catalyst for use in oligomerization of olefins, which utilizes the diolefin nickel halide complexes obtained by the invention process demonstrates the following advantages: having an improved oligomerization activity, it improves the yield of the intended oligomer; having improved stability; it improves the reproducibility of the oligomerization reaction; having improved selectivity, it is effective in narrowing the molecular distribution range of the intended oligomer; possessing a shortened induction period for the oligomerization, the reaction can be carried out with advantage, and the catalyst preparation is easy.

Heretofore, processes for the preparation of π-allylic metal compounds and processes for the oligomerization of olefins using such compounds have been known from the specifications of British Pats. Nos. 1,058,679 and 1,058,680. British Pat. No. 1,058,679 discloses a process for the preparation of π-allylic metal compounds of π-allylic–QX type (wherein Q stands for a transition metal and X stands for an anionic residue) which comprises reacting a π-allylic-metal compound of π-allyl–Q type such as bis π-allyl nickel and bis π-cyclo-octadiene nickel-(O) with an acidic compound represented by HX (wherein X stands for an anionic residue) such as hydrogen halides.

In this proposal, a zero-valent π-allylic metal compound such as bis π-allyl nickel (O) and his π-cyclo-octadiene nickel (O) is used as the starting material. Such starting material is synthesized through a complicated method comprising various steps, and hence the process of said British patent cannot escape from the defects of low yields and high costs of the starting material. Further, the diolefin nickel halogen compounds obtained in accordance with the process of British Pat. No. 1,058,679 are more unstable and difficult to deal with as compared with the diolefin nickel halide complexes obtained in accordance with the process of this invention in which a nickel salt is used as the starting material.

In accordance with the process of the present invention the many drawbacks hereinabove noted can be surmounted and diolefin nickel halide complexes having the many excellent utilities described above can be prepared.

While it has been confirmed that the reaction product obtained by the invention process is a complex of a diolefin with a nickel halide (see Example 1), we cannot yet confirm the reaction mechanism and the structure of the complex obtained. As the result of the elemental analysis, molecular weight, mass spectrum, hydrogenation reaction, decomposition reaction by means of iodine, the reaction with triphenyl phosphine, and the known structure of the Co and Rh complexes, its structure (when butadiene has been used as the conjugated diolefin) is presumed to be as follows:

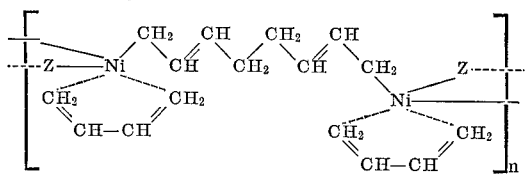

(Z is halogen and $n$ is an integer of at least 1).

FIG. 1 shows an infrared spectra of the butadiene nickel bromide complex of Example 1 prepared in accordance with the invention process.

The reaction mechanism is presumed to proceed in the following manner:

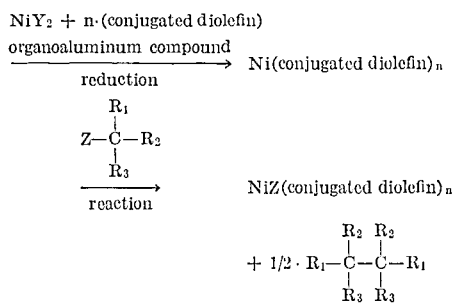

(wherein Z is a halogen, Y is an anion or chelate ligand, $n$ is an integer of 1 to 3, generally 2, and $R_1$ $R_2$ and $R_3$ have the meanings previously defined.)

As the nickel salts to be used as the starting material of the invention process, included are the nickel halides such as, for example, nickel chloride, nickel bromide and nickel iodide; the nickel salts of dibasic acids such as, for example, nickel malonate and nickel phthalate; and the nickel chelate compounds of 1,3-diketone such as, for example, nickel benzoylacetonate and nickel benzoyl acetophenonate. Particularly desirable is nickel acetylacetonate.

While all of the conjugated diolefins can be conveniently used, especially preferred are 1,3-butadiene, 1,3-pentadiene, isoprene, cyclopentadiene, 1,3-cyclohexadiene and 1,3-cyclooctadiene.

As the organoaluminum compounds for reducing the nickel salts, available are the various organoaluminum compounds having reducing property such as, for example, trialkylaluminum, dialkylaluminum alkoxide and alkali metal aluminum tetraalkyl, but expecially preferred are such as triethylaluminum, triisobutylaluminum, diethylaluminum ethoxide and sodium-aluminum tetraethyl.

In the invention process, first of all a nickel salt such as hereinbefore named is reduced by an organo-aluminum compound such as indicated above in the presence of an above mentioned conjugated diolefin.

While there is no particular restriction as to the molar proportion of the reaction components in this case, the conjugated diolefin can be usually used in an amount of 1–20 mols per mol of the nickel salt. Its copresence in an amount of 2 to 5 mols is especially convenient. On the other hand, the aluminum compound can be usually used in an amount of 0.5 to 10 mols, and preferably 1 to 3 mols per mol of the nickel salt.

This reduction reaction is carried out at the temperature below 50° C. It is usually preferably carried out in the range of from —30° to +50° C., and particularly from 0° to +10° C. In carrying out this reduction reaction, at times a part of an aluminum compound separates out as a precipitate. In such a case the precipitate is preferably removed by filtration.

The so obtained reaction system is then reacted with the previously indicated compounds of the following formula

The compounds having the above-indicated formula include, e.g. 1-bromo-1,1-diphenylethane, 1-chloro-1,1-diphenylethane, 1-iodo-1,1-diphenylethane, 1-bromo-1,1-diphenylpropane, 1-bromo-1,1-diphenylbutane, 1-bromo-1,1-diphenyl-2-methylpropane, 1-bromo-1,1-diphenylpentane, 2-bromo-2-phenylpropane, 2-bromo-2-phenylbutane, 3-bromo-3-phenylpentane, 1-bromo-1-cyclohexyl-1-phenylethane, dibromodiphenylmethane, tribromophenylmethane and a carbon tetrahalide such as carbon tetrachloride.

The reaction between the reduced solution system hereinbefore described and the aforesaid halogenated hydrocarbon or carbon tetrahalide is usually carried out at below 20° C., e.g. —50° to 20° C., and preferably from —20° to 0° C. There is a tendency that metallic nickel separates out at above 20° C., and also an excessive decline in the yield of the intended organonickel compound takes place. Hence, the reaction is preferably conducted at a temperature below 20° C.

A reaction period of 2 hours to 50 hours is usually sufficient, but a reaction period of 5 hours to 10 hours is preferred. Since the intended diolefin nickel halide complex separates out as a precipitate in the reaction system, the reaction time can be readily determined in accordance with the class of reactants, the reaction temperature and other reaction conditions.

The compound represented by the following formula

is mixed with the organic nickel compound obtained by the aforementioned process at an equimolar ratio or over-equimolar ratio to the nickel compound, and then the reaction is conducted between them.

The reaction is preferably carried out in the presence of an inert organic solvent. As such solvents, included are the various solvents not possessing active hydrogen, for example, ethers such as ethyl ether, tetrahydrofuran and dioxane; aromatic hydrocarbons and halogenated aromatic hydrocarbons such as benzene, toluene and chlorobenzene, aliphatic hydrocarbons and halogenated aliphatic hydrocarbons such as pentane, hexane, methylene chloride, dichloroethane, dichloroethylene and trichloroethylene; and alicyclic hydrocarbons such as cyclopentane and cyclohexane. In view of the separation of the byproducts, purification and drying of the intended diolefin nickel halide complex, the use of the ethers is particularly desirable, and inter alia the use of ethyl ether. However, when the reaction is conducted under such conditions that the diolefins maintain their liquid state, a solvent need not be added particularly, the material diolefin being made to serve also as the solvent.

The resulting diolefin nickel halide complex usually has a reddish brown color, varying somewhat depending on the classes of the diolefin and halogen and conditions of synthesis. If the resulting diolefin nickel halide complex is thoroughly dried, it is stable in an inert gas at room temperature. On the other hand, it is unstable in oxygen and water to become promptly decomposed thereby, and in the air there is a possibility of ignition. Hence, all of the hereinbefore described synthesizing reaction operations should be preferably carried out in an atmosphere of dried, inert gas.

The following examples are given for illustrating a number of modes of practicing the invention process.

EXAMPLE 1

In a 4-necked 1-liter flask thoroughly dried and purged with argon in advance are placed 82 grams (0.32 mol) of nickel acetylacetonate and suspended in 500 ml. of dry ethyl ether. After cooling the suspension to —20° C., 85 grams of dry butadiene are dissolved therein. 114 ml. (0.76 mol) of diethylaluminum ethoxide are then added, and the mixture is maintained at a reaction temperature of 0° to 10° C. with an ice bath. The reaction is continued for several hours while in the meantime the color of the suspension turns from green to yellow and then to red, and the reaction is completed upon exhaustion of the unreacted nickel acetylacetonate. The pricipitate of the aluminum compound, the by-product, is removed by filtration, and the resulting reddish brown filtrate is used in the next reaction.

Two hundred ml. of the filtrate (nickel content 0.089 mol) are cooled to below −40° C., to which are then added 170 ml. of a hexane solution of 1,1-diphenyl-1-bromoethane (content of 1,1-diphenyl-1-bromoethane 0.089 mol), after which the mixture is maintained at −10° to −5° C. for 5.5 hours with stirring. The resulting reddish brown precipitate is separated by filtration at a low temperature, washed thrice with ethyl ether, and thereafter vacuum dried to obtain 19.7 grams (yield 99%) of the intended product. Its elemental analysis values are Ni:Br:C:H=1.06:1.04:8:11.90, and it corresponds to NiBrC$_8$H$_{12}$. This product decomposes at 120°±5° C. Its infrared absorption spectrum is shown in FIG. 1. No absorption of acetylacetonate (1250, 1300, 1370, 1410, 1613 and 1710 cm.$^{-1}$) can be noted, a trans double bond (967 cm.$^{-1}$) is present, and it is shown from its ESR spectrum that it possesses paramagnetism.

EXAMPLE 2

Example 1 is repeated using 2-bromo-2-phenylpropane instead of 1,1-diphenyl-1-bromoethane. The elemental analysis values of the product are Ni:Br:C:H=1.03:1.07:8:11.90, and from its color configuration and infrared absorption spectra it was the same complex as that obtained in Example 1.

EXAMPLE 3

Nickel chloride is used instead of nickel acetylacetonate, and an ether solution of reduced nickel synthesized as in Example 1 is reacted in an equimolar quantity with an ether solution of 2.05 grams of dichlorodiphenylethane. The reaction begins in the neighborhood of −2.0° C. and a brown precipitate forms. By filtration at a low temperature, washing and drying, 1.7 grams of butadiene nickel chloride complex is obtained, whose decomposition temperature is 113±5° C.

EXAMPLE 4

The solution of reduced nickel synthesized as in Example 1 is added to an ether solution of carbon tetrabromide at −78° C. After removing the blackish brown precipitate which immediately forms, the reaction is conducted at −40° to −30° C. to obtain a brown precipitate. This is separated and dried. This is the same as the butadiene nickel bromide complex obtained in Example 1.

EXAMPLE 5

3.65 grams of purified trichlorobromoethane are dissolved in about 100 ml. of ethyl ether followed by cooling to −78° C. To this solution are added 41.2 ml. of a solution of reduced nickel synthesized as in Example 1 (in an equimolar quantity with respect to nickel). After conducting the reaction for about 15 hours at below −55° C., the resulting precipitate is separated by filtration, and an orange precipitate is obtained by reacting at −20° C. being separated by filtration followed by washing with ether and vacuum drying. This is the same as the butadiene nickel bromide complex obtained in Example 1. It was obtained in an amount of 2.35 grams (yield 67%). Its decomposition temperature is 110°±5° C.

EXAMPLES 6–10

In accordance with the procedure of Example 1 nickel acetylacetonate is reduced with triethylaluminum in the presence of butadiene, the ether solution thereof then being acted upon by various halogenated hydrocarbons. The results obtained are shown in Table I, below.

TABLE I

| Example: | Halogenated hydrocarbon | Temperature, °C. | Time, hr. | Yield, percent |
|---|---|---|---|---|
| 6 | 2-bromo-2-phenylbutane | −10∼−5 | 10 | 57 |
| 7 | 2-bromo-2-phenylpentane | −10∼−5 | 10 | 32 |
| 8 | 1-bromo-1-cyclohexyl-1-phenylethane | −5∼0 | 10 | 13 |
| 9 | 2-bromo-2-naphthylpropane | 0∼5 | 15 | 12 |
| 10 | 2-chloro-2-tolylpropane | −20∼−10 | 20 | 17 |

EXAMPLE 11

After suspending 2.25 grams of nickel acetylacetonate in 50 ml. of ethyl ether, 4.36 ml. of 1,3-pentadiene are added thereto. 2.65 ml. of diethylaluminum ethoxide are then added at −25° C. When this mixture is held at 3° to 5° C. for about an hour, it turns to a dark brown liquid. Next, an equimolar quantity of a hexane solution of 1-bromo-1-diphenylethane is added. When the mixture is held at −10° to 0° C. for about 8 hours, a brown precipitate is obtained. This is a nickel pentadiene complex of the same type as that of Example 1 and from its elemental analysis values it corresponds to C$_{10}$H$_{16}$NiBr. It was obtained in an amount of 1.14 grams (yield 53%) and its decomposition temperature was 116°±5° C.

EXAMPLE 12

1.07 grams (4.2 m-mols) of nickel acetylacetonate is suspended in 50 ml. of ethyl ether. After dissolving 2.4 grams (45 m-mols) of butadiene therein, 1.37 grams (6.6 m-mols) of sodium aluminum tetraethyl is added thereto at −20° C. The mixture is then held at 3° to 5° C. When it becomes a reddish brown solution, it is reacted with an equimolar quantity of 1,1-diphenyl-1-bromoethane for 5 hours at −5° C. The resulting reddish brown precipitate is separated by filtration, washed and dried. 0.92 gram (yield 89%) of the product was obtained. From its infrared absorption spectra it was shown to be the same complex as that obtained in Example 1.

EXAMPLE 13

Two grams (7.8 m-mols) of nickel acetylacetonate are suspended in 50 ml. of ethyl ether, followed by the addition thereto of 1.5 grams (22 m-mols) of isoprene, and at −20° C. 1.6 grams (8.1 m-mols) of triisobutylaluminum. The mixture is then held at 3° to 5° C. After adding an equimolar quantity of 2-chloro-2-phenylpropane, the reaction is carried out for 5 hours at −15° to 50° C., whereupon a brown precipitate is formed. This is separated by filtration, washed and dried to obtain 1.5 grams of an isoprene nickel chloride complex whose decomposition temperature is 115±5° C.

EXAMPLE 14

1.9 grams (7.6 m-mols) of nickel acetylacetonate is suspended in 50 ml. of ethyl ether, followed by the addition thereto of 3.1 ml. of cyclopentadiene and 3.1 ml. of diethylaluminum ethoxide. When this mixture is held at 0° to 10° C., it becomes a reddish brown solution. After the suspension of the nickel acetylacetonate has completely reacted, 14.3 ml. of a hexane solution of 1,1-diphenyl-1-bromoethane (18.9 m-mols/ml.) are added and the reaction is carried out for 10 hours at −10° to 0° C. followed by treating as in Example 1 to obtain 0.3 gram of a brown precipitate having a decomposition temperature of 108±5° C.

EXAMPLES 15–18

Example 1 was repeated using nickel compounds of various classes instead of nickel acetylacetonate. The results obtained are shown in Table II, below.

TABLE II

| | Nickel compound, g. | Aluminum compound | Solvent | Temperature, °C. | Time, hr. | Yield, g. |
|---|---|---|---|---|---|---|
| Example: | | | | | | |
| 15 | Nickel bromide, 1.9 | Triethylaluminum | Chlorobenzene | 5-15 | 25 | 0.3 |
| 16 | Nickel acetate, 2.3 | do | Ethyl ether | 10-15 | 40 | 0.3 |
| 17 | Nickel oxalate, 4.1 | do | Chlorobenzene | 0-5 | 40 | 0.2 |
| 18 | Nickel oxalate, 2.1 | do | Tetrahydrofuran | 0-5 | 40 | 0.8 |

The following examples will illustrate the preparation of catalysts to be used in the oligomerization of olefins, wherein as one of the constituent components of the catalyst the diolefin nickel halide complexes obtained as in Examples 1–18 are used; and also the oligomerization of olefins using the so prepared catalysts.

EXAMPLE 19

0.277 gram (1.24 m-mols) of the butadiene nickel bromide complex obtained in Example 1 is dissolved in 100 ml. of chlorobenzene. After adding 1.2 m-mols of aluminum tribromide at below −30° C., ethylene is blown in at −20° C. 57.9 grams of ethylene was reacted and the activity of the catalyst was exhausted in about 30 minutes. The product consisted of 32.7 grams (56.5%) of dimers and 18.7 grams (32.3%) of trimers. The results of an analysis by gas chromatography showed that of the dimers 3.1% was butene-1, 77.3% was trans-butene-2 and 19.6% was cis-butene-2; and of the trimers 47% was trans-3-methylpentene-2 and 16% was trans-hexene-2.

EXAMPLES 20–25

When in Example 19 one equivalent of aluminum tribromide and one equivalent of one of the organometallic compounds of elements of the Group V–A of the periodic table indicated in Table III, below, were used with the butadiene nickel bromide and the polymerization reaction was carried out for 20 minutes at −20° to 10° C., the results shown in Table III were obtained.

TABLE III

| | Amount of nickel complex catalyst, m-mol | Organometallic compound | Product | |
|---|---|---|---|---|
| | | | Dimers, g. | Trimers, g. |
| Example: | | | | |
| 20 | 2.45 | Triphenylarsine | 70 | 6 |
| 21 | 2.81 | Triphenylstibine | 55 | 6 |
| 22 | 3.10 | Triphenylbismuth | 50 | 7 |

The experiments were conducted in the same manner except that the organometallic compounds of elements of the Group V–A of the periodic table were changed and the reactions were carried out at a temperature of −30° to −10° C. and for 30–50 minutes, with the results shown in Table IV, below.

TABLE IV

| | Butadiene nickel bromide complex, mmol | AlBr₃, mmol | Organometallic compound mmol | Product | |
|---|---|---|---|---|---|
| | | | | Dimers, g. | Trimer, g. |
| Example: | | | | | |
| 23 | 2.02 | 2.02 | Triphenylphosphine, 2.02 | 354 | 44 |
| 24 | 2.41 | 2.41 | Triisopropylphosphine, 2.41 | 60 | 70 |
| 25 | 2.03 | 3.55 | Triphenylphosphite, 2.03 | 48 | 6 |

EXAMPLES 26–34

The polymerization of propylene was carried out for 10 minutes at normal atmospheric pressure in a chlorobenzene solvent using a combination of the complex prepared in Example 1 and an equimolar quantity of an aluminum halide. The results obtained are shown in Table V, below.

TABLE V

| | Amount of catalyst, mmol | Aluminum compound | Reaction temperature, °C. | Product [1], g. |
|---|---|---|---|---|
| Example: | | | | |
| 26 | 0.94 | Aluminum trichloride | −35~−26 | 10 |
| 27 | 2.24 | Aluminum tribromide | −40~−27 | 19 |
| 28 | 5.33 | Aluminum triiodide | −39~−29 | 18 |
| 29 | 2.92 | Diethylaluminum chloride | −35~−30 | 7 |
| 30 | 2.41 | Ethylaluminum dichloride | −35~−15 | 6 |
| 31 | 2.42 | Diethylaluminum ethoxide | −47~−37 | 6 |

[1] Total of dimers and trimers.

When other solvents were used instead of the chlorobenzene in Example 26, the results shown in Table VI, below, were obtained.

TABLE VI

| | Amount of catalyst, mmol | Solvent | Reaction temperature, °C. | Product [1], g. |
|---|---|---|---|---|
| Example: | | | | |
| 32 | 2.57 | Cyclohexane | −40~−28 | 13 |
| 33 | 2.38 | Pentane | −30~−25 | 8 |
| 34 | 2.05 | Tetrachloroethylene | −30~−15 | 18 |
| 35 | 2.08 | Hexane | −30~−20 | 9 |

[1] Total of dimers and trimers.

What is claimed is:
1. A process for preparing diolefin nickel halide complexes which comprises reacting at a temperature below 20° C. (a) a system obtained by reducing at a temperature below 50° C. a nickel salt selected from the group consisting of nickel halides, nickel salts of dibasic acids and nickel chelate compounds of 1,3-diketones with an organoaluminum compound selected from the group consisting of trialkylaluminum, dialkylaluminum alkoxide and alkali metal aluminum tetraalkyl in the presence of a conjugated diolefin of 4–8 carbon atoms, with (b) a compound of the following formula

wherein Z is halogen, $R_1$, $R_2$ and $R_3$, which may be the same or different, are each a member selected from the group consisting of halogens, lower alkyl, cyclohexyl and phenyl, with the proviso that $R_1$, $R_2$ and $R_3$ are not each phenyl.

2. The process according to claim 1 wherein said conjugated diolefin is a member selected from the group consisting of 1,3-butadiene, 1,3-pentadiene, isoprene, cyclopentadiene, 1,3-cyclohexadiene and 1,3-cyclooctadiene.

3. The process according to claim 1 wherein said nickel salt is a member selected from the group consisting of nickel chloride, nickel bromide, nickel iodide, nickel malonate, nickel phthalate, nickel benzoylacetonate, nickel benzoyl acetophenonate and nickel acetylacetonate.

4. The process according to claim 1 wherein said organoaluminum compound is a member selected from the group consisting of triethylaluminum, triisobutylaluminum, diethylaluminum ethoxide and sodium aluminum tetraethyl.

5. The process according to claim 1 wherein the compound represented by said formula is a member selected from the group consisting of 1-bromo-1,1-diphenylethane, 1-chloro-1,1-diphenylethane, 1 - iodo-1,1-diphenylethane, 1-bromo-1,1-diphenylpropane, 1 - bromo-1,1-diphenylbutane, 1-bromo-1,1-diphenyl-2-methylpropane, 1-bromo-1,1-diphenylpentane, 2-bromo-2-phenylpropane, 2-bromo-2-phenylbutane, 3-bromo-3-phenylpentane, 1-bromo-1-cyclohexyl-1-phenylethane, dibromodiphenylmethane, tribromophenylmethane and carbon tetrachloride.

6. The process according to claim 1 wherein said reduced system is one in which said conjugated diolefin is copresent in an amount of 1 to 20 mols per mol of said nickel salt and said system is one which has been reduced by using said organoaluminum compound in an amount ranging from 0.5 to 10 mols based on said nickel salt.

7. The process according to claim 6 wherein said reduced system is one whose reaction has been conducted at reducing reaction temperature varying between —30° and +50° C.

8. The process according to claim 1 wherein the reaction between said reduced system and the compound represented by said formula is carried out at a reaction temperature varying between —50° and +20° C.

9. The process according to claim 1 wherein the reaction between said reduced system and the compound represented by said formula is carried out in the presence of an inert organic solvent.

10. The process according to claim 9 wherein said inert organic solvent is a solvent not possessing active hydrogen, said solvent being selected from the group consisting of ethers, aromatic hydrocarbons, halogenated aromatic hydrocarbons, aliphatic hydrocarbons, halogenated aliphatic hydrocarbons and alicyclic hydrocarbons.

11. The process according to claim 10 wherein said inert organic solvent is selected from the group consisting of ethyl ether, tetrahydrofuran, dioxane, benzene, toluene, chlorobenzene, pentane, hexane, methylene chloride, dichloroethane, dichloroethylene, trichloroethylene, cyclopentane and cyclohexane.

References Cited

UNITED STATES PATENTS

| | | | |
|---|---|---|---|
| 3,413,376 | 11/1968 | Cleary | 260—683.15 |
| 3,417,160 | 12/1968 | Hambling et al. | 260—683.15 |
| 3,452,115 | 6/1969 | Schneider | 260—683.15 |

TOBIAS E. LEVOW, Primary Examiner

A. P. DEMERS, Assistant Examiner

U.S. Cl. X.R.

252—429, 431; 260—683.15